US012797894B2

(12) United States Patent
Sagawa et al.

(10) Patent No.: US 12,797,894 B2
(45) Date of Patent: Nov. 17, 2026

(54) TREATMENT LIQUID SUPPLYING METHOD AND SUBSTRATE TREATING APPARATUS

(71) Applicant: SCREEN Holdings Co., Ltd., Kyoto (JP)

(72) Inventors: Hidetoshi Sagawa, Kyoto (JP); Junki Nishimura, Kyoto (JP); Satoshi Yamamoto, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 170 days.

(21) Appl. No.: 18/834,964

(22) PCT Filed: Nov. 21, 2022

(86) PCT No.: PCT/JP2022/043002
§ 371 (c)(1),
(2) Date: Jul. 31, 2024

(87) PCT Pub. No.: WO2023/153045
PCT Pub. Date: Aug. 17, 2023

(65) Prior Publication Data

US 2025/0108403 A1 Apr. 3, 2025

(30) Foreign Application Priority Data

Feb. 10, 2022 (JP) ................................ 2022-019693

(51) Int. Cl.
*B05C 11/10* (2006.01)
*B05B 15/531* (2018.01)
*F16K 23/00* (2006.01)

(52) U.S. Cl.
CPC ........ *B05C 11/1026* (2013.01); *B05B 15/531* (2018.02); *F16K 23/00* (2013.01)

(58) Field of Classification Search
CPC ..... F16K 23/00; B05C 11/1026; B05B 15/50; B05B 15/531
(Continued)

(56) References Cited

U.S. PATENT DOCUMENTS 5,134,962 A * 8/1992 Amada .............. H10P 72/0448 239/71
5,927,605 A * 7/1999 Odajima ............... G05D 7/005 251/30.02
(Continued)

FOREIGN PATENT DOCUMENTS

| | | |
|---|---|---|
| CN | 109482381 A | 3/2019 |
| JP | H05-293358 A | 11/1993 |

(Continued)

OTHER PUBLICATIONS

Extended European Search Report dated Dec. 23, 2025 in corresponding European Patent Application No. 22926061.7.
(Continued)

*Primary Examiner* — Steven J Ganey
(74) *Attorney, Agent, or Firm* — OSTROLENK FABER LLP

(57) ABSTRACT

The present invention relates to a treatment liquid supplying method and a substrate treating apparatus. The treatment liquid supplying method for a substrate treating apparatus provided with a nozzle configured to eject a treatment liquid, a pipe connected to the nozzle, an on-off valve provided on the pipe, and a suck back valve provided on the pipe between the nozzle and the on-off valve includes an ejection stopping step of stopping ejection of the treatment liquid from the nozzle by causing the on-off valve to perform closing operation, and a liquid cut-off position adjusting step of adjusting a liquid cut-off position as a position where the treatment liquid in a column shape ejected from the nozzle is cut off by causing the suck back valve to perform first
(Continued)

suction operation in association with the closing operation by the on-off valve.

8 Claims, 8 Drawing Sheets

(58) Field of Classification Search
USPC .............. 239/106, 119; 251/30.02, 63.5, 331
See application file for complete search history.

(56) References Cited

U.S. PATENT DOCUMENTS

| | | | | |
|---|---|---|---|---|
| 10,600,647 | B2 * | 3/2020 | Imamura | B05B 12/088 |
| 2015/0264790 | A1 | 9/2015 | Miyagi et al. | |
| 2017/0278696 | A1 * | 9/2017 | Imamura | B05B 12/088 |
| 2018/0046083 | A1 | 2/2018 | Kashiyama | |
| 2019/0076763 | A1 | 3/2019 | Ichino et al. | |
| 2020/0227285 | A1 | 7/2020 | Iwao et al. | |

FOREIGN PATENT DOCUMENTS

| | | | |
|---|---|---|---|
| JP | 2010-171295 | A | 8/2010 |
| JP | 2014-082471 | A | 5/2014 |
| JP | 2016-111306 | A | 6/2016 |
| JP | 2016-115731 | A | 6/2016 |
| JP | 2016-139665 | A | 8/2016 |
| JP | 6420604 | B2 | 10/2018 |
| JP | 2019-012824 | A | 1/2019 |
| JP | 2021-102178 | A | 7/2021 |
| TW | tw | | 12/2016 |
| TW | 202010003 | A | 3/2020 |
| WO | WO 2014/050941 | A1 | 4/2014 |

OTHER PUBLICATIONS

International Search Report and Written Opinion mailed Jan. 24, 2023 in corresponding PCT International Application No. PCT/JP2022/043002.

Office Action mailed Jul. 20, 2023 in corresponding Taiwanese Application No. 111145253.

* cited by examiner

Fig. 4

| | | SUCTION DELAY TIME DL1 (SECOND) | | | | | | | | | | | |
|---|---|---|---|---|---|---|---|---|---|---|---|---|---|
| | | 0.05 | 0.10 | 0.15 | 0.20 | 0.25 | 0.30 | 0.35 | 0.40 | 0.45 | 0.50 | 0.55 | 0.60 |
| CLOSING TIME CT (SECOND) | 0.1 | C | A | A | A | A | B | C | C | C | C | - | - |
| | 0.2 | - | C | C | A | A | A | A | B | C | C | C | C |
| | 0.3 | - | - | - | C | B | A | A | A | A | B | C | C |

A:GOOD

B:AVERAGE (USABLE)

C:POOR

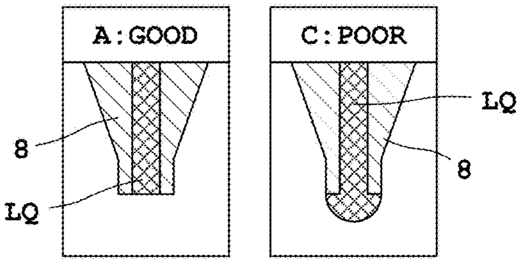

Fig. 5

| | | SUCTION TIME SK1 (SECOND) | | | | | | | | |
|---|---|---|---|---|---|---|---|---|---|---|
| | | 0.10 | 0.15 | 0.20 | 0.25 | 0.30 | 0.35 | 0.40 | 0.45 | 0.50 |
| SUCTION DELAY TIME DL1 (SECOND) | 0.20 | A | A | A | A | B | B | C | C | C |
| | 0.25 | A | A | A | A | B | B | C | C | C |
| | 0.30 | A | A | A | A | B | C | C | C | C |
| | 0.35 | A | A | A | A | B | C | C | C | C |

A: Liquid Level Position immediately after Liquid Cut-Off of -2 mm or more to 0 mm or less B: Liquid Level Position immediately after Liquid Cut-Off of more than 0 mm and 2 mm or less C: Liquid Level Position immediately after Liquid Cut-Off of more than +2 mm

TREATMENT LIQUID SUPPLYING METHOD AND SUBSTRATE TREATING APPARATUS

RELATED APPLICATIONS

This application is the U.S. National Phase application under 35 U.S.C. § 371, of international Application No. PCT/JP2022/043002, filed on Nov. 21, 2022, which in turn claims the benefit of Japanese Application No. 2022-019693, filed on Feb. 10, 2022, the disclosures of which Applications are incorporated by reference herein.

TECHNICAL FIELD

The present invention relates to a treatment liquid supplying method and a substrate treating apparatus for performing treatment on substrates. Examples of substrates include semiconductor substrates, substrates for flat panel displays (FPDs), glass substrates for photomasks, substrates for optical disks, substrates for magnetic disks, ceramic substrates, and substrates for solar cells. Examples of the FPDs include liquid crystal display devices and organic electroluminescence (EL) display devices.

BACKGROUND ART

A currently-used substrate treating apparatus includes a nozzle configured to eject a treatment liquid, a pipe connected to the nozzle, an on-off valve provided on the pipe, and a suck back valve provided on the pipe between the nozzle and the on-off valve (see, for example, Patent Literatures 1 and 2). The suck back valve is used for sucking the treatment liquid within the nozzle.

PRIOR ART DOCUMENT

Patent Literature

[Patent Literature 1]
Japanese Patent Publication No. 6420604
[Patent Literature 2]
Japanese Unexamined Patent Publication No. 2019-012824

SUMMARY OF INVENTION

Technical Problem

However, the currently-used substrate treating apparatus possess the following drawback. Reference is made to FIGS. 10(*a*) to 10(*c*). When the on-off valve is opened, a treatment liquid LQ in a column shape is ejected from a nozzle 108 (see FIG. 10(*a*)). Thereafter, when the on-off valve is closed, ejection of the treatment liquid stops. Since the treatment liquid has viscosity, a liquid cut-off position of the treatment liquid is below the nozzle 108. Such a tendency becomes significant when the ejection of the treatment liquid having medium or high viscosity (e.g., 45 to 500 cP) is stopped, leading to deterioration of so-called a liquid cut-off condition. If the liquid cut-off condition is deteriorated, the treatment liquid cut off below the nozzle 108 and hung down is drawn back toward the nozzle 108 by a surface tension of the treatment liquid, and the treatment liquid protrudes from an ejection port at a tip end of the nozzle in a hemispherical shape.

Detailed description of this phenomenon is as under. When the on-off valve is closed, the treatment liquid moves slightly and then stops due to its poor stop performance and reactivity as well as its inertia force. Accordingly, a liquid cut-off position (level) shown in FIG. 10(*b*) is below the nozzle 108. If the liquid cut-off position is below the nozzle 108, the treatment liquid LQ in a column shape adjacent to the tip end of the nozzle returns to a tip end face of the nozzle due to its surface tension after the liquid cut-off, whereby the treatment liquid LQ protrudes in a hemispherical shape from the ejection port at the tip end of the nozzle 108 (see FIG. 10(*c*)). As a result, a liquid level position of the treatment liquid after the liquid cut-off is slightly below the tip end of the nozzle 108. Here in the present specification, the term "liquid cut-off position" refers to a position where the treatment liquid LQ ejected from the nozzle 108 and extending in a column shape is cut off into two when the on-off valve is closed (see FIG. 10(*b*)). Moreover, in the present specification, the term "liquid level position" refers to a downstream end position of the treatment liquid in a passage in the nozzle 108 after the liquid cut-off or a downstream end position of the treatment liquid in a hemispherical shape protruding from the ejection port at a tip end of the nozzle 108.

In general, the liquid cut-off is adjusted in accordance with a closing speed of the on-off valve. However, in a case of a treatment liquid with high viscosity, it is extremely difficult to improve a liquid cut-off condition with an operation speed of the on-off valve. That is because, if the on-off valve is closed at a high speed for improving the liquid cut-off, pressure variation of the treatment liquid in the on-off valve becomes excessive, generating inconvenience such as air bubble formation. This results in various problems, such as film thickness unevenness, coating unevenness, particles, and nozzle contamination, caused by a poor liquid cut-off condition. For example, when the treatment liquid LQ in a column shape adjacent to the tip end of the nozzle returns to the tip end face of the nozzle after the liquid cut-off due to its surface tension, the treatment liquid scatters, resulting in film thickness unevenness and coating unevenness. Moreover, under a state where the treatment liquid LQ in a hemispherical shape protrudes from the ejection port of the tip end of the nozzle 108, a solvent in the treatment liquid vaporizes and a solidified matter of the treatment liquid adheres to the tip end of the nozzle 108. This causes particles and nozzle contamination. Furthermore, a droplet at the tip end of the nozzle may fall during nozzle movement. If the droplet falls on a substrate, coating unevenness, film thickness abnormality, and deterioration of particles may occur. Furthermore, if the droplet falls outside of the substrate, contamination occurs in a space at a position where it falls.

As described above, various inconvenience occurs when the treatment liquid is collected in a hemispherical shape at the tip end of the nozzle 108 after the liquid cut-off, and therefore adjustment of the liquid level position after the liquid cut-off has already been made with use of the suck back valve. Specifically, the suck back valve operates after the on-off valve is closed to enlarge a passage in the valve, whereby the treatment liquid within the passage connecting the nozzle is sucked back and the liquid level position of the treatment liquid is set within the nozzle 108. This prevents evaporation of the solvent in the treatment liquid. However, as is easily understood, the liquid level position of the treatment liquid is adjusted, but the liquid cut-off position of the treatment liquid is not adjusted in the currently-used approach. Consequently, an inconvenience caused by the liquid cut-off position of the treatment liquid lower than the nozzle cannot be solved by a currently-used technique of adjusting the liquid level of the treatment liquid with use of the suck valve.

It should be noted that the Patent Literature 1 discloses a coating device provided with a "filter" on the pipe between the suck back valve and the nozzle. The coating device can adjust closing operation of the on-off valve and start of suction operation of the suck back valve. This can easily perform liquid cut-off adjustment (preventing liquid drip generated by dropping of the treatment liquid from the nozzle after supply of the treatment liquid from the nozzle temporarily stops due to closing operation of the on-off valve). Moreover, in the Patent Literature 1, the "liquid cut-off" is defined as actually stopping supply of the treatment liquid. That is, the Patent Literature 1 fails to refer to adjustment of the "liquid cut-off position" in the present application.

The present invention has been made regarding the state of the art noted above, and its one object is to provide a treatment liquid supplying method and a substrate treating apparatus that allow easy adjustment of a liquid cut-off position.

Solution to Problem

The present invention is constituted as stated below to achieve the above object. One aspect of the present invention discloses a treatment liquid supplying method for a substrate treating apparatus provided with a nozzle configured to eject a treatment liquid, a pipe connected to the nozzle, an on-off valve provided on the pipe, and a suck back valve provided on the pipe between the nozzle and the on-off valve. The method includes an ejection stopping step of stopping ejection of the treatment liquid from the nozzle by causing the on-off valve to perform closing operation, and a liquid cut-off position adjusting step of adjusting a liquid cut-off position as a position where the treatment liquid in a column shape ejected from the nozzle is cut off by causing the suck back valve to perform suction operation in association with the closing operation by the on-off valve.

With the treatment liquid supplying method according to the aspect of the present invention, the suck back valve is caused to perform the suction operation in association with the closing operation by the on-off valve for adjusting the liquid cut-off position. This results in easy adjustment of the liquid cut-off position, thereby achieving easy alignment of the liquid cut-off position with a tip end face of the nozzle. Moreover, the liquid cut-off position is easily adjustable, achieving prevention of generation of film thickness unevenness, coating unevenness and the like caused by a poor liquid cut-off condition.

Moreover, it is preferred in the treatment liquid supplying method described above that the liquid cut-off position adjusting step includes adjusting the liquid cut-off position to a level of a tip end face of the nozzle. When the liquid cut-off position is adjusted to the tip end face of the nozzle, variation in ejection volume of the treatment liquid from the nozzle can be suppressed, whereby the film thickness unevenness can be prevented caused by the poor liquid cut-off condition, for example.

Moreover, it is preferred that the treatment liquid supplying method described above further includes a liquid level position adjusting step of adjusting a liquid level position of the treatment liquid as a downstream end position of the treatment liquid in a passage in the nozzle by causing the suck back valve to perform second suction operation after the liquid cut-off position adjusting step. That is, in the treatment liquid supplying method, the suction operation is performed in two stages. The suction operation is used for adjusting the liquid cut-off position, whereas the second suction operation is used for adjusting the liquid level position of the treatment liquid in the nozzle.

Moreover, it is preferred in the treatment liquid supplying method described above, a speed of the suction operation in the liquid cut-off position adjusting step is higher than a speed of the second suction operation in the liquid level position adjusting step. Performing the suction operation in the liquid cut-off position adjusting step at a relatively high speed achieves adjustment of the liquid cut-off position. Moreover, performing the second suction operation in the liquid level position adjusting step at a relatively low speed prevents a droplet as a particle source from separating from the sucked treatment liquid.

Moreover, it is preferred in the treatment liquid supplying method described above that the second suction operation in the liquid level position adjusting step is started after delay time from a time point when the suction operation in the liquid cut-off position adjusting step is finished to a pre-set time point elapses. Since the delay time is present between the suction operation and the second suction operation, unstable liquid cut-off can be prevented.

Moreover, it is preferred in the treatment liquid supplying method described above that, in the liquid cut-off position adjusting step, the liquid cut-off position is adjusted by starting the suction operation with the suck back valve in a pre-set period of time from a time point when the on-off valve finishes the closing operation. The liquid cut-off position can be adjusted easily if the treatment liquid having higher viscosity is used.

Moreover, it is preferred in the treatment liquid supplying method described above that, in the liquid cut-off position adjusting step, the liquid cut-off position is adjusted by starting the suction operation with the suck back valve during the closing operation of the on-off valve and by finishing the suction operation after the closing operation. The liquid cut-off position can be adjusted easily if the treatment liquid having medium viscosity or low viscosity is used.

Another aspect of the present invention discloses a substrate treating apparatus including a nozzle configured to eject a treatment liquid, a pipe connected to the nozzle, an on-off valve provided on the pipe, a suck back valve provided on the pipe between the nozzle and the on-off valve, and a controller, the controller stopping ejection of the treatment liquid from the nozzle by causing the on-off valve to perform closing operation, and the controller adjusting a liquid cut-off position as a position where the treatment liquid in a column shape ejected from the nozzle is cut off by causing the suck back valve to perform suction operation in association with the closing operation by the on-off valve.

With the substrate treating apparatus according to the other aspect of the present invention, the suck back valve is caused to perform the suction operation in association with the closing operation by the on-off valve for adjusting the liquid cut-off position. This results in easy adjustment of the liquid cut-off position, thereby achieving easy alignment of the liquid cut-off position with a tip end face of the nozzle. Moreover, the liquid cut-off position is easily adjustable, achieving prevention of generation of film thickness unevenness, coating unevenness and the like caused by a poor liquid cut-off condition.

Moreover, it is preferred in the substrate treating apparatus described above that the controller adjusts a liquid level position of the treatment liquid as a downstream end position of the treatment liquid in a passage in the nozzle by causing the suck back valve to perform second suction operation after the liquid cut-off position is adjusted. That is, the controller performs the suction operation in two stages. The suction operation is used for adjusting the liquid cut-off position, whereas the second suction operation is used for adjusting the liquid level position of the treatment liquid in the nozzle.

Moreover, it is preferred in the substrate treating apparatus described above that the suck back valve is a single suck back valve and that the controller causes the single suck back valve to perform the suction operation and the second suction operation. The liquid cut-off position can be adjusted easily with use of the single suck back valve.

Moreover, it is preferred that the substrate treating apparatus described above further includes a second suck back valve provided on the pipe between the nozzle and the on-off valve, and that the controller causes the suck back valve to perform the suction operation and causes the second suck back valve to perform the second suction operation. The liquid cut-off position can be adjusted easily with use of the two suck back valves.

Advantageous Effects of Invention

With the treatment liquid supplying method and the substrate treating apparatus according to the present invention, the liquid cut-off position can be adjusted easily.

BRIEF DESCRIPTION OF DRAWINGS

FIG. 4 is an evaluation result showing a relationship between closing time of the on-off valve and suction delay time of the suck back valve.

FIG. 5 is an evaluation result showing a relationship between the suction delay time of the suck back valve and suction time of the suck back valve.

FIRST EMBODIMENT

Figure 1:
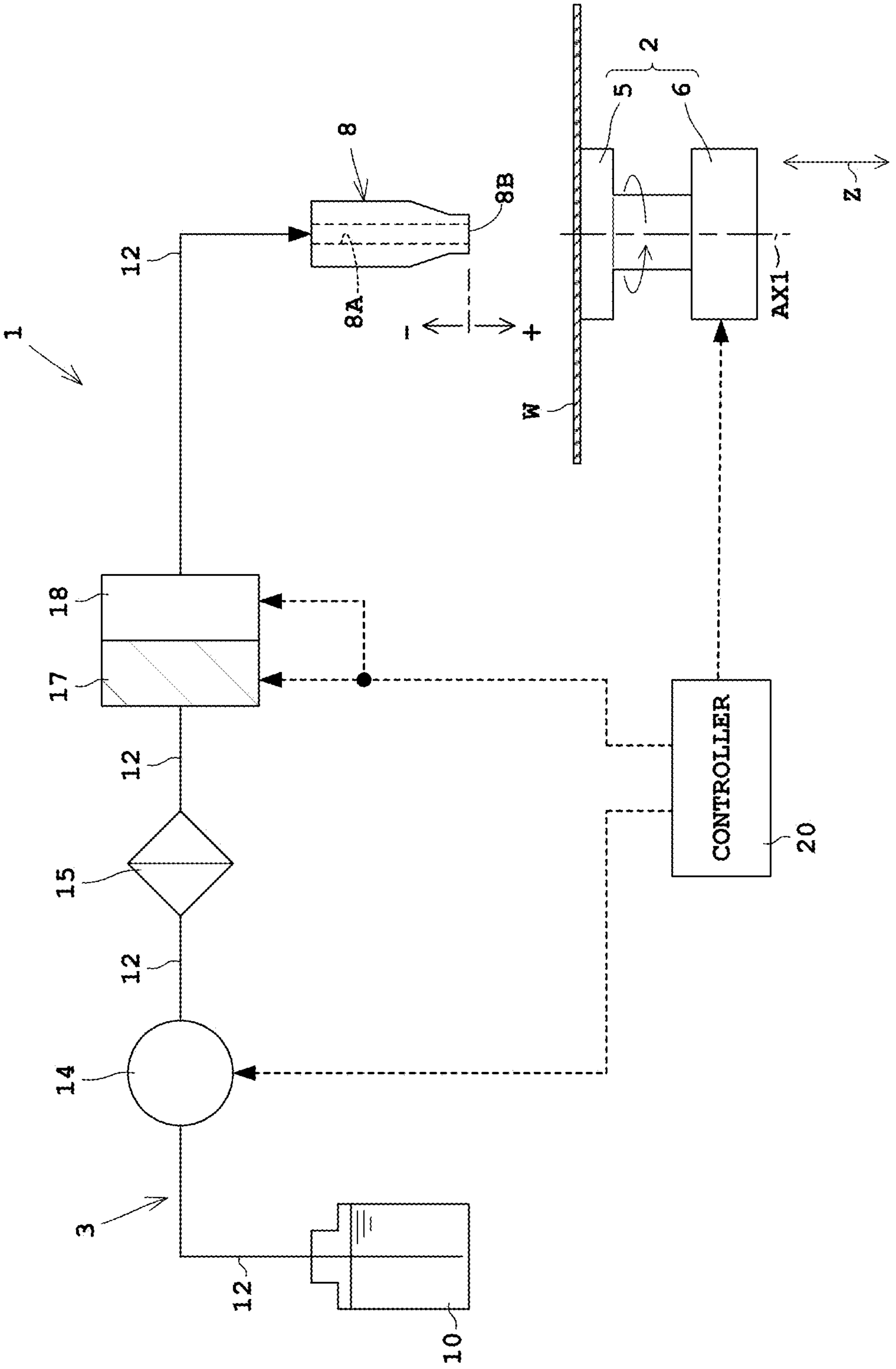
FIG. 1 schematically illustrates a substrate treating apparatus according to a first embodiment.
Figure 2:
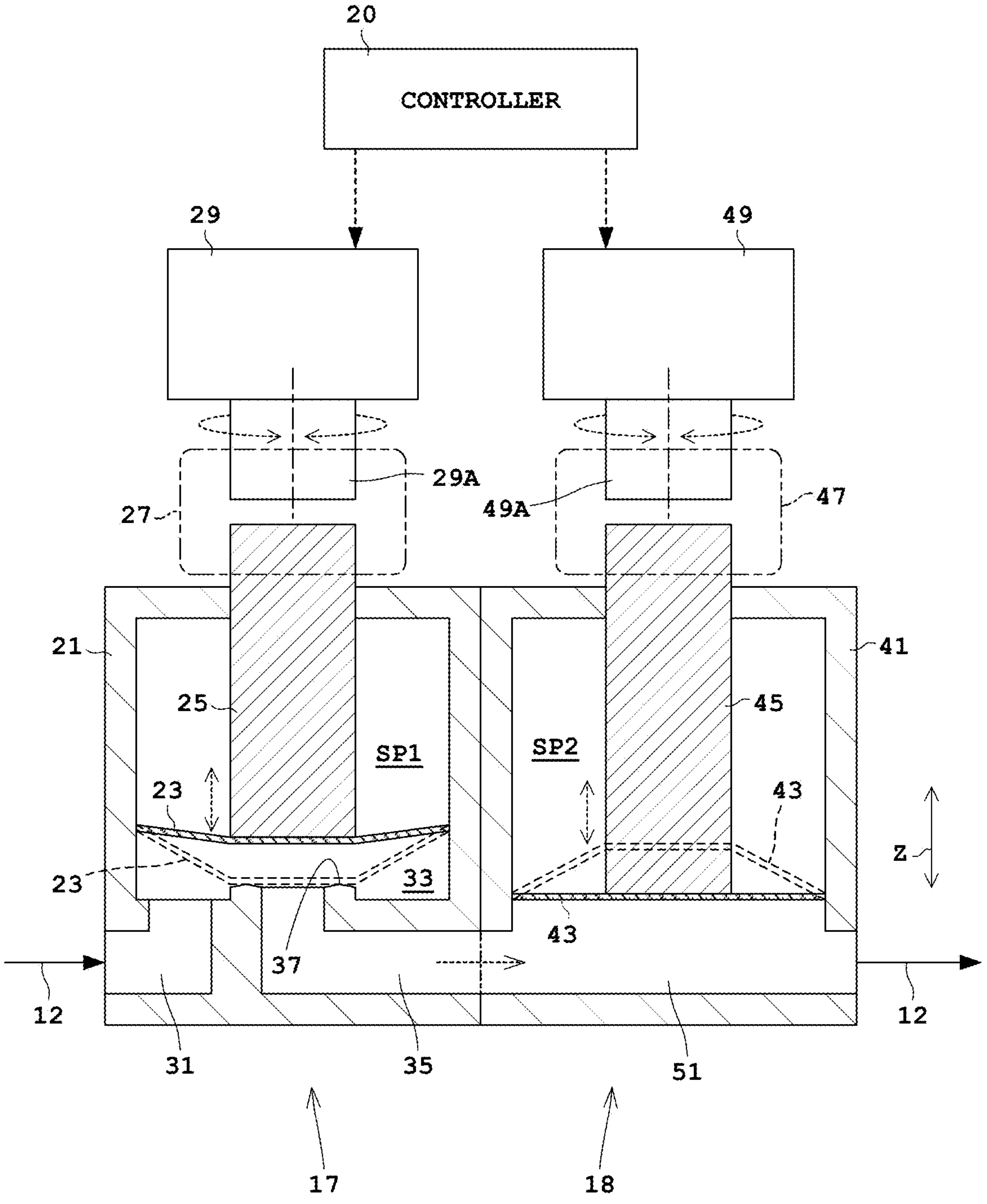
FIG. 2 is a longitudinal sectional view of an on-off valve and a suck back valve.
Figure 3:
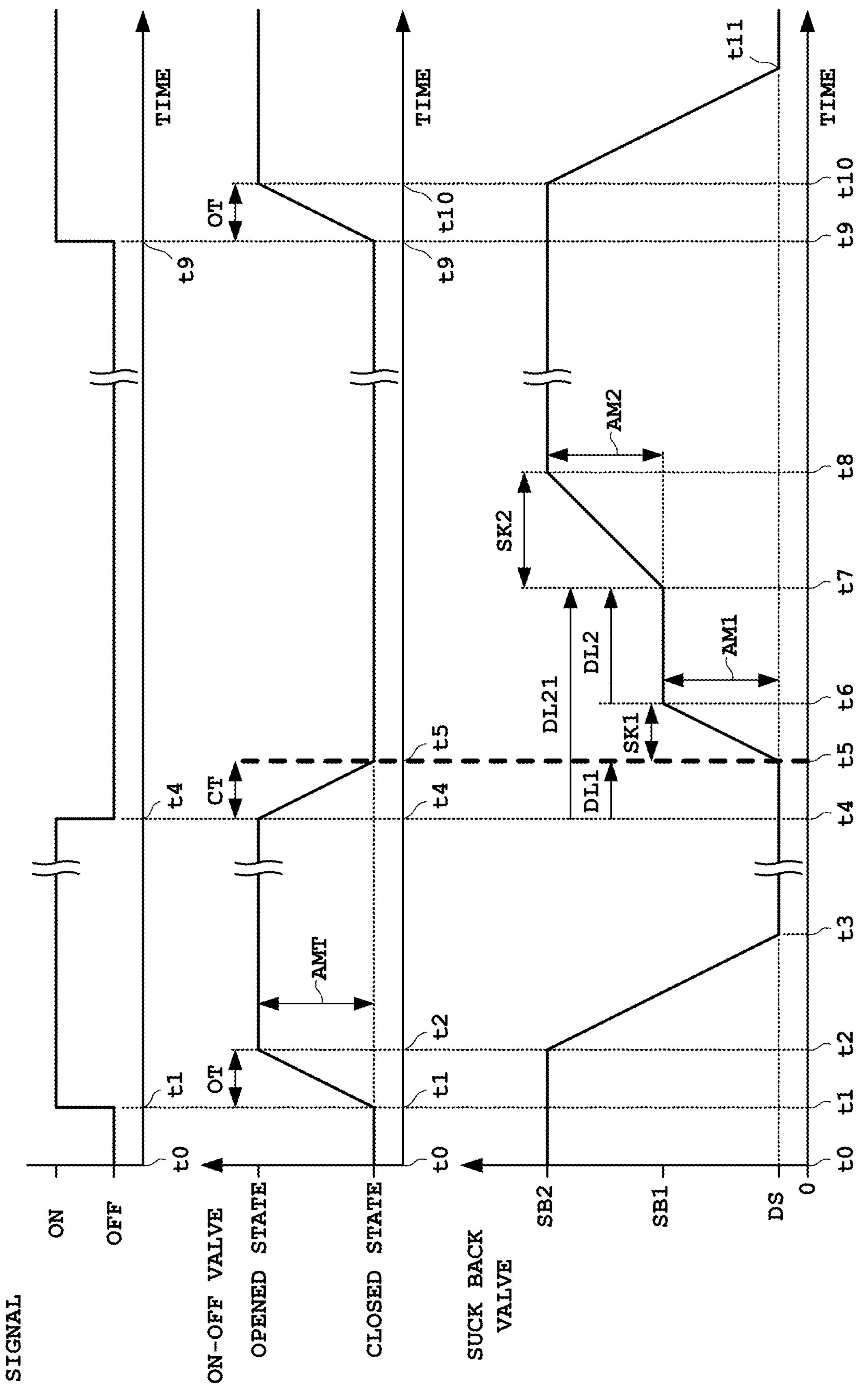
FIG. 3 is a timing chart illustrating operation of the substrate treating apparatus according to the first embodiment.

A first embodiment of the present invention will now be described with reference to the drawings. FIG. 1 schematically illustrates a substrate treating apparatus according to the first embodiment. FIG. 2 is a longitudinal sectional view of an on-off valve and a suck back valve. FIG. 3 is a timing chart illustrating operation of the substrate treating apparatus according to the first embodiment.

(1) Construction of Substrate Treating Apparatus 1

Reference is made to FIG. 1. The substrate treating apparatus 1 includes a holding rotator 2 and a treatment liquid supplying unit 3. The holding rotator 2 holds a substrate W in a horizontal posture, and rotates the substrate W around a vertical axis AX1 passing through substantially the center of the substrate W. The holding rotator 2 includes a spin chuck 5 and a rotating mechanism 6. The rotating mechanism 6 includes an electric motor, for example. The rotating mechanism 6 cause the spin chuck 5, holding the substrate W, to rotate around the vertical axis AX1.

The spin chuck 5 is configured to hold a lower face of the substrate W by vacuum adsorption, for example. Moreover, the spin chuck 5 may include a spin base and a plurality of pin members (each of which is not shown). In this case, the pin members are erected on a top face of the spin base so as to be arranged in a ring shape around the vertical axis AX1. Then, the pin members sandwich a side face of a substrate W, whereby the substrate W is held while being separated from the top face of the spin base.

The treatment liquid supplying unit 3 includes a nozzle 8, a treatment liquid supplying source 10, a pipe 12, a pump 14, a filter 15, an on-off valve 17, and a suck back valve 18.

The nozzle 8 ejects a treatment liquid. The nozzle 8 includes an inner passage 8A and an ejection port 8B. The inner passage 8A is formed so as to extend in an up-down direction. The ejection port 8B is provided in a tip end face of the nozzle 8, i.e., a lower end of the inner passage 8A. A diameter of the ejection port 8B is 1.5 mm, for example. However, the diameter of the ejection port 8B is not limited to 1.5 mm. The treatment liquid supplying source 10 stores the treatment liquid. The treatment liquid supplying source 10 is, for example, a bottle. Examples of the treatment liquid include a photoresist solution, an SOG (Spin on glass coating) solution, an SOD (Spin on dielectric coating) solution, a polyimide resin solution, or a liquid for forming an antireflection film.

A terminal end of the pipe 12 is connected to a proximal end of the nozzle 8. A proximal end of the pipe 12 is inserted into the treatment liquid supplying source 10. The pump 14 is for feeding the treatment liquid toward the nozzle 8. The pump 14 is provided on the pipe 12 between the nozzle 8 and the treatment liquid supplying source 10. The filter 15 is for removing foreign substances and air bubbles in the treatment liquid. The filter 15 is provided on the pipe 12 between the nozzle 8 and the pump 14.

The on-off valve 17 performs supply and stops supply of the treatment liquid from the nozzle 8. The on-off valve 17 is provided on the pipe 12 between the nozzle 8 and the filter 15. The suck back valve 18 performs suction operation and pushing out operation. The suck back valve 18 is provided on the pipe 12 between the nozzle 8 and the on-off valve 17. The suck back valve 18 is adjoined to the on-off valve 17, but may be separated from the on-off valve 17.

Moreover, the substrate treating apparatus 1 includes a controller 20 and a memory unit (not shown). The controller 20 controls components of the substrate treating apparatus 1. The controller 20 includes one or more processors like a central processing unit (CPU). The memory unit includes, for example, at least one of a read-only memory (ROM), a random-access memory (RAM), and a hard disk. The memory unit stores computer programs necessary for controlling each component of the substrate treating apparatus 1.

Reference is made to FIG. 2. Description is made of constructions of the on-off valve 17 and the suck back valve 18. The on-off valve 17 is integrated with the suck back valve 18. The on-off valve 17 and the suck back valve 18 are formed by a digital control valve (DCV), for example, that allows adjustment of various parameters with electric signals.

The on-off valve 17 includes a case 21, a diaphragm 23, a rod 25, a converter 27, and an electric motor 29. The case 21 includes an upstream passage 31, an on-off chamber 33, and a connecting passage 35.

The upstream passage 31, the on-off chamber 33, and the connecting passage 35 are each a space provided inside of the case 21. The upstream passage 31 is connected to a part of the pipe 12 adjacent to the filter 15. The on-off chamber 33 includes a valve seat 37 for receiving the diaphragm 23. The connecting passage 35 is connected to a suck back passage 51 mentioned later.

The diaphragm 23 is used as a valve element. An outer periphery of the diaphragm 23 is attached to a side wall of an inner space of the case 21. The diaphragm 23 separates the on-off chamber 33 from a space SP1 shown in FIG. 2. Accordingly, the treatment liquid within the on-off chamber 33 does not escape into the space SP1.

Moreover, a middle part of the diaphragm 23 is connected to a lower end of the rod 25. An upper end of the rod 25 is connected to a rotation output shaft 29A of the electric motor 29 via the converter 27. The converter 27 and a converter 47 mentioned later each include a plurality of gears and a guide portion. The converter 27 converts rotation of the rotation output shaft 29A of the electric motor 29 to linear motion of the rod 25 in an axis direction (Z-direction in FIG. 2). Here, stepping motors (pulse motors) are used as the electric motor 29 and an electric motor 49 mentioned later.

When the electric motor 29 rotates the rotation output shaft 29A in a forward direction, the rod 25 and the middle part of the diaphragm 23 move downward, and thereafter, the middle part of the diaphragm 23 is pressed against the valve seat 37 (see the diaphragm 23 demoted by dotted lines in FIG. 2). Thereby, the treatment liquid stops flowing from the on-off chamber 33 to the connecting passage 35. That is, the on-off valve 17 is under a closed state.

When the electric motor 29 rotates the rotation output shaft 29A in a reverse direction from such a state, the rod 25 and the middle part of the diaphragm 23 move upward. Thereby, the middle part of the diaphragm 23 separates from the valve seat 37 (see the diaphragm 23 demoted by solid lines in FIG. 2). Thereby, the treatment liquid flows from the on-off chamber 33 to the connecting passage 35. That is, the on-off valve 17 is under an opened state.

The suck back valve 18 includes a case 41, a diaphragm 43, a rod 45, a converter 47, and an electric motor 49. The case 41 includes a suck back passage 51. The suck back passage 51 is a space provided inside of the case 41. The suck back passage 51 is connected to a part of the pipe 12 adjacent to the nozzle 8. The upstream passage 31, the on-off chamber 33, the connecting passage 35 and the suck back passage 51 are in fluid communication with one another.

The diaphragm 43 is used as a valve element. An outer periphery of the diaphragm 43 is attached to a side wall of an inner space of the case 41. The diaphragm 43 separates the suck back passage 51 from a space SP2 shown in FIG. 2. Moreover, a middle part of the diaphragm 43 is connected to a lower end of the rod 45. An upper end of the rod 45 is connected to a rotation output shaft 49A of the electric motor 49 via the converter 47. The converter 47 converts rotation of the rotation output shaft 49A of the electric motor 49 to linear motion of the rod 45 in the axis direction.

When the electric motor 49 rotates the rotation output shaft 49A in the forward direction, the rod 45 and the middle part of the diaphragm 43 move downward (see the diaphragm 43 denoted by solid lines in FIG. 2). Thereby, a volume of the suck back passage 51 is reduced. When the volume of the suck back passage 51 is reduced, suck back valve 18 performs pushing out operation.

In contrast to this, when the electric motor 49 rotates the rotation output shaft 49A in a reverse direction, the rod 45 and the middle part of the diaphragm 43 move upward (see the diaphragm 43 denoted by dotted lines in FIG. 2). Thereby, a volume of the suck back passage 51 is increased. When the volume of the suck back passage 51 is increased, suck back valve 18 performs suction operation.

(2) Operation of Substrate Treating Apparatus 1

Next, description will be given of operation of the substrate treating apparatus 1 with reference to FIG. 3. A transport robot, not shown, transports a substrate W to the spin chuck 5 on the holding rotator 2. The spin chuck 5 holds the transported substrate W. The rotating mechanism 6 rotates the spin chuck 5, holding the substrate W, at any timing for spreading a treatment liquid over the substrate W.

At a time point t0 in FIG. 3, the on-off valve 17 is under the closed state. That is, the middle part of the diaphragm 23 in the on-off valve 17 is pressed against the valve seat 37. Moreover, at a time point t0, a level of the middle part of the diaphragm 43 in the suck back valve 18 is at a pre-set suck back position SB2.

At a time point t1, the controller 20 causes an ON signal (open signal) to be sent to the electric motor 29 of the on-off valve 17, thereby performing opening operation by the on-off valve 17. This causes the treatment liquid to be ejected from the nozzle 8 to the substrate W (treatment liquid ejecting step).

The opening operation of the on-off valve 17 starts at the time point t1 and finishes at a time point t2. A period of time from the time point t1 to the time point t2 is called opening time OT. Moreover, a numeral AMT in FIG. 3 denotes an operating amount (moving amount) of the diaphragm 23 in the on-off valve 17. The operating amount AMT is given by the number of steps. That is, in the opening operation, the middle part of the diaphragm 23 is moved by the operating amount AMT in the opening time OT.

Moreover, the controller 20 causes the suck back valve 18 to start pushing out operation when the opening operation is finished at the time point t2. Thereafter, the pushing out operation is finished at a time point t3. In the pushing out operation, the middle part of the diaphragm 43 in the suck back valve 18 is moved from the suck back position SB2 to an ejection position DS. An operating amount (moving amount) of the middle part of the diaphragm 43 is also given by the number of steps.

Thereafter, at a time point t4, the controller 20 causes an OFF signal (close signal) to be sent to the electric motor 29 of the on-off valve 17, thereby performing closing operation by the on-off valve 17. Thereby, the nozzle 8 stops ejecting the treatment liquid (ejection stopping step).

The closing operation starts at the time point t4 and finishes at a time point t5. A period of time from the time point t4 to the time point t5 is called closing time CT. In the closing operation, the middle part of the diaphragm 23 is moved by the operating amount AMT, described above, in the closing time CT. The closing time CT is, for example, 0.1 seconds to 0.3 seconds.

Figure 10:
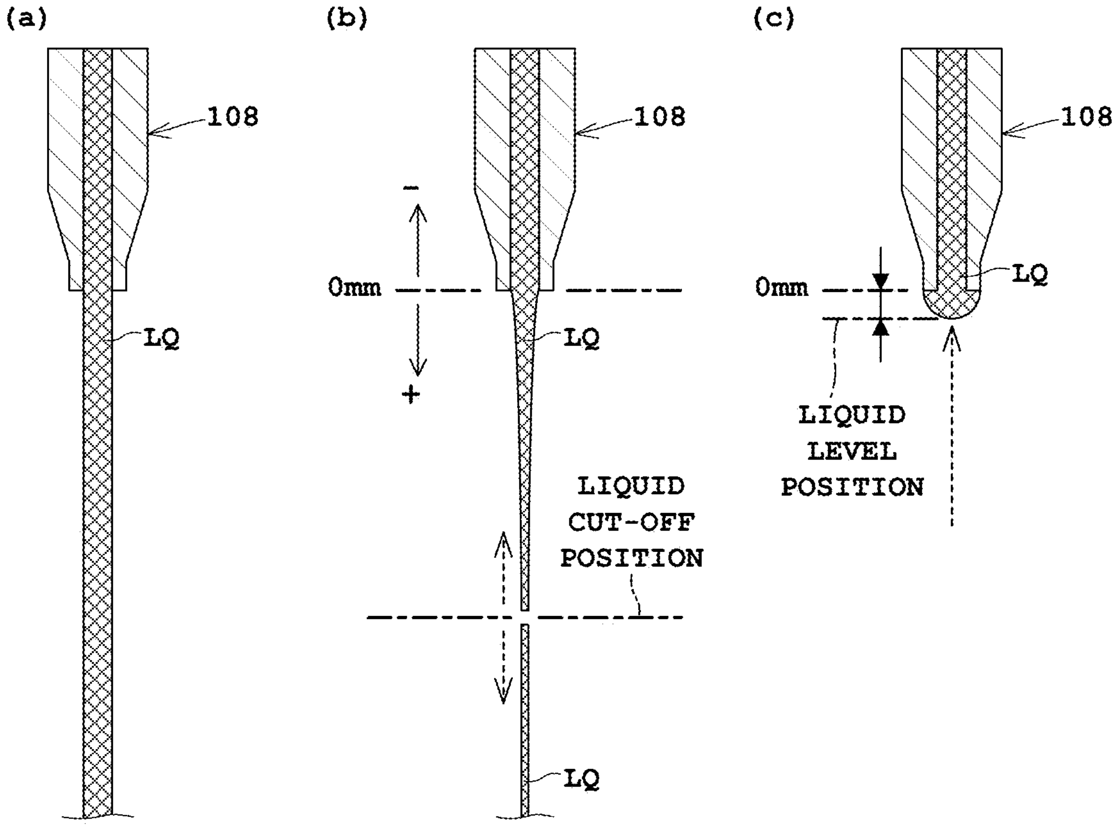
FIG. 10(*a*) illustrates a condition where a treatment liquid in a column shape is ejected from a nozzle, FIG. 10(*b*) is a view for explanation of a liquid cut-off position, and FIG. 10(*c*) illustrates a treatment liquid in a hemispherical shape adhered to a tip end of the nozzle immediately after liquid cut-off.

In general, a liquid cut-off condition (liquid cut-off) is adjusted by changing the closing time CT. However, in a case of a treatment liquid with high viscosity, the liquid cut-off position of the treatment liquid by the closing operation by the on-off valve 17 is lower than the level of the tip end face of the nozzle 8, leading to great difficulty in adjustment of the liquid cut-off condition by changing the closing time CT. Then, the controller 20 causes the suck back valve 18 to perform first suction operation in association with the closing operation of the on-off valve 17, thereby adjusting the liquid cut-off position (liquid cut-off position adjusting step). As shown in FIG. 10(*b*), the liquid cut-off position is a position where the treatment liquid LQ in a column shape ejected from the nozzle 8 (nozzle 108) is cut off into two.

The controller 20 adjusts the liquid cut-off position to or near the level of the tip end face of the nozzle 8 (or the level of the ejection port 8B). As shown in FIG. 10(*c*), the liquid cut-off position is determined indirectly with use of a liquid level position immediately after the liquid cut-off. The liquid level position immediately after the liquid cut-off is, for example, adjusted to fall within a range of −2 mm to 0 mm if the level of the tip end face of the nozzle 8 is assumed 0 mm. Moreover, a range of the liquid level position indirectly representing the liquid cut-off position is preferably from −0.5 mm to 0 mm. From the above, such an inconvenience due to the liquid cut-off position being lower than the tip end of the nozzle 8 (e.g., film thickness unevenness or particle generation) can be prevented.

Specifically, description is made of the first suction operation of the suck back valve 18 in association with the closing operation of the on-off valve 17. When the liquid cut-off position is adjusted, the controller 20 causes the suck back valve 18 to start the first suction operation at a time point t5 when the on-off valve 17 finishes the closing operation. That is, the suck back valve 18 starts the first suction operation when a pre-set suction delay time DL1 from start of the closing operation of the on-off valve 17 (time point t4) to the time point t5 elapses. The first suction operation is performed in suction time SK1 from the time point t5 to the time point t6. Moreover, the operating amount AM1 (the number of steps) corresponds to a distance between the ejection position DS to an adjusting position SB1. In the first suction operation, the middle part of the diaphragm 43 in the suck back valve 18 is moved by the operating amount AM1 in the suction time SK1. That is, a moving speed of the middle part of the diaphragm 43 is a value obtained by dividing the operating amount AM1 by the suction time SK1.

At a time point t7 after the cut-off position is adjusted, the controller 20 causes the suck back valve 18 to perform the second suction operation, thereby performing adjustment to a suck back position SB2 where the liquid level position of the treatment liquid within the nozzle 8 is further drawn upward the liquid level position after the liquid cut-off (liquid level position adjusting step). The liquid level position is drawn upward within the nozzle 8, whereby the solvent can be prevented from volatilization from the treatment liquid remained within the nozzle 8. The second suction operation is suck back operation for adjusting the liquid level position. An operating amount AM2 of the second suction operation (the number of steps) corresponds to a distance from the adjusting position SB1 to the suck back position SB2. The second suction operation is performed at a speed obtained by dividing the operating amount AM2 by the suction time SK2.

Moreover, the second suction operation is performed at a lower speed than the first suction operation. That is, the speed of the first suction operation in the liquid cut-off position adjusting step is higher than the speed of the second suction operation in the liquid level position adjusting step. Here, the suction time SK1 for the first suction operation is, for example, 0.1 seconds to 0.2 seconds. In contrast to this, the suction time SK2 for the second suction operation is, for example, 2 seconds to 3 seconds with the treatment liquid of high viscosity. Here, the suction time SK2 with the treatment liquid having middle viscosity or low viscosity is 0.8 seconds to 1 second. The two operating amounts AM1 and AM2 are each different occasionally.

For example, in a case where the middle part of the diaphragm 43 is moved once from the ejection position DS to the suck back position SB2 by the first suction operation and where the first suction operation is too fast, a droplet of the treatment liquid is separated from the sucked treatment liquid and the separated droplet may adhere to an inner wall of the inner passage 8A of the nozzle 8. The droplet is not preferable since it may be a particle source when dried. Moreover, if the first suction operation is too slow, normal suck back operation is performed for the liquid level position adjustment, leading poor function for adjusting the liquid cut-off position. Accordingly, it is preferable to adjust the liquid cut-off position by performing the first suction operation in the liquid cut-off position adjusting step at a relatively high speed. Moreover, performing the second suction operation in the liquid level position adjusting step at a relatively low speed prevents a droplet as a particle source from separating from the sucked treatment liquid.

Moreover, the second suction operation starts after a second suction delay time DL2 from the time point t6 where the first suction operation finishes to a pre-set time point t7 elapses. The second suction delay time DL2 is around one second (about 0.5 seconds to 1.5 seconds), for example, but is not limited to this time. Since the second suction delay time DL2 is present between the first suction operation and the second suction operation, unstable liquid cut-off can be prevented. Here, the second suction operation is performed after a suction delay time DL21 as the total of the first suction delay time DL1, the suction time SK1, and the second suction delay time DL2 elapses when the time point t4 at which a close signal is sent from the controller 20 is used as a reference.

After a pre-set volume of a treatment liquid is ejected from the nozzle 8 to an upper face of the substrate W and the rotating mechanism 6 rotates the substrate W, rotation of the substrate W by the rotating mechanism 6 stops. Thereafter, the spin chuck 5 release holding of the substrate W. Then, the transport robot holds the substrate W on the spin chuck 5, and transports the substrate W to a next destination.

Then, the treatment liquid is supplied from the nozzle 8 to an upper face of another substrate W transported on the spin chuck 5. Operation of the on-off valve 17 and the suck back valve 18 at time points t9, t10, and t11 is same as the operation of the on-off valve 17 and the suck back valve 18 at the time points t1, t2, and t3.

(3) Each Parameter of First Suction Operation

In this embodiment, the controller 20 causes the suck back valve 18 to perform the first suction operation in association with the closing operation of the on-off valve 17. This yields adjustment of the liquid cut-off position. Parameters for adjusting the liquid cut-off position include the "suction delay time DL1", the "operating amount AM1", and the "suction time SK1".

(3-1) Suction Delay Time DL1 (Operation Timing)

In a case of a treatment liquid having relatively high viscosity (e.g., 325 cP), the liquid has flowability even after the closing operation of the on-off valve 17 is finished. Accordingly, there is time for the liquid to stop completely. Performing the first suction operation within the time achieves adjustment of the liquid cut-off position.

FIG. 4 is an evaluation result showing a relationship between the closing time CT and the suction delay time DL1 of the on-off valve 17. Here, constant values are used for the operating amount AM1 and the suction time SK1 individually. In the evaluation in FIG. 4 and FIG. 5, a silicone oil of 325 cP is used. Determination A indicates that the liquid cut-off position is at or near the tip end face of the nozzle 8, and that a function of adjusting the liquid cut-off position sufficiently works. Determination B indicates a stage before a hemispherical droplet is formed at the tip end of the nozzle 8 immediately after the liquid cut-off. For example, the determination B is a state where the droplet protrudes slightly to a plus side from the tip end face of the nozzle 8. It can be considered that a function of adjusting the liquid cut-off position also works in the state indicated by the determination B (usable). Determination C indicates that a hemispherical droplet adheres to the tip end of the nozzle 8 immediately after the liquid cut-off, and that the function of adjusting the liquid cut-off position does not work.

Description is made of an evaluation result in a case where the closing time CT in FIG. 4 is "0.1 seconds", for example. If the suction delay time DL1 is "0.05 seconds", starting the first suction operation is too fast, and thus a suction effect is not exerted satisfactorily. Accordingly, the liquid cut-off position is below the tip end face of the nozzle 8. As a result, a hemispherical droplet is formed at the tip end face of the nozzle 8, giving the determination C. Moreover, if the suction delay time DL1 is "from 0.1 seconds to 0.25 seconds", this gives the determination A. In this case, the liquid cut-off position is near the tip end face of the nozzle 8, and thus a droplet does not adhere to the tip end face of the nozzle 8. Moreover, if the suction delay time DL1 is "0.30 seconds", this gives the determination B. Moreover, if the suction delay time DL1 is "from 0.35 seconds to 0.50 seconds", a timing of the first suction operation is slow. Therefore, the liquid cut-off position is below the tip end face of the nozzle 8. That is, a hemispherical droplet adheres to the tip of the nozzle 8 for a moment, and then, the first suction operation starts. Accordingly, the operation works in the same manner as normal suck back operation (liquid level position adjustment).

Moreover, it is confirmed in FIG. 4 that a range width (period of time) between the determination A and the determination B is from 0.2 seconds to 0.25 seconds at three closing time CT. Moreover, it is confirmed that a range of the determination A (effective range of the function of adjusting the liquid cut-off position) is shifted by the closing time CT. For example, if the closing time CT is 0.1 seconds, a first end of the range of the determination A corresponds to the suction delay time DL1 of 0.10 seconds. Moreover, if the closing time CT is 0.2 seconds, a first end of the range of the determination A corresponds to the suction delay time DL1 of 0.20 seconds. From these, it is effective that the first suction operation is performed at the time point t5 in FIG. 3, for example, where the on-off valve 17 is completely closed.

(3-2) Operating Amount AM1

The operating amount AM1 corresponds to a suction volume of the treatment liquid. If the operating amount AM1 is small, the liquid level position immediately after the liquid cut-off protrudes to the plus side from the tip end face of the nozzle 8. If the operating amount AM1 is large, a state immediately after the liquid cut-off is drawn into a minus side from the tip end face of the nozzle 8. If the operating amount AM1 is excessively large, a droplet is separated from the sucked treatment liquid, and the droplet easily adheres to the inner wall of the inner passage 8A of the nozzle 8. Accordingly, the operating amount AM1 is set in a not too large and not too small range.

(3-3) Suction Time SK1

The suction time SK1 is a parameter concerning a suction speed. FIG. 5 is an evaluation result showing a relationship between the suction delay time DL1 and the suction time SK1. The suction delay time DL1 in FIG. 5 is the suction delay time DL1 (0.2 seconds to 0.35 seconds) when the closing time CT in FIG. 4 is 0.2 seconds, giving the determination A. Here, a constant value is used for the operating amount AM1.

Then, the liquid level position of −2 mm or more and 0 mm or less immediately after the liquid cut-off gives the determination A. Moreover, the liquid level position of more than 0 mm and 2 mm or less immediately after the liquid cut-off gives the determination B. The determination B is also considered as a usable range. In this regard, the determination B may be considered unusable. Moreover, if the determination B is usable, a range of the liquid level position immediately after the liquid cut-off that indirectly represents the liquid cut-off position is from −2 mm to 2 mm. Moreover, the liquid level position of more than 2 mm immediately after the liquid cut-off gives the determination C.

It is confirmed from FIG. 5 that the function of adjusting the liquid cut-off position satisfactorily works when the suction time SK1 is small, i.e., rapid suction is performed. Moreover, it is confirmed that a range width (period of time) of the determination A and the determination B is approximately from 0.2 seconds to 0.25 seconds. Here, when the suction time SK1 falls in the range of the determination C, timing for sucking the treatment liquid is late, and the function of adjusting the liquid cut-off position does not exert and is performed in the same manner as the normal suck back operation for adjusting the liquid level position.

According to this embodiment, the suck back valve 18 is caused to perform the first suction operation in association with the closing operation of the on-off valve 17 to adjust the liquid cut-off position. This results in easy adjustment of the liquid cut-off position, thereby achieving easy alignment of the liquid cut-off position with or in the vicinity of a tip end face of the nozzle 8. Moreover, the liquid cut-off position is easily adjustable, achieving prevention of generation of film thickness unevenness, coating unevenness and the like caused by a poor liquid cut-off condition.

Moreover, the controller 20 adjusts the liquid cut-off position to or near the level of the tip end face of the nozzle 8 when the liquid cut-off position is adjusted. When the liquid cut-off position is adjusted to or near the tip end face of the nozzle 8, variation in ejection volume of the treatment liquid from the nozzle 8 can be suppressed, whereby the film thickness unevenness can be prevented caused by the poor liquid cut-off condition, for example.

Moreover, after the liquid cut-off position is adjusted, the controller 20 causes the suck back valve 18 to perform the second suction operation, thereby performing adjustment of the liquid level position of the treatment liquid within the nozzle 8. That is, the controller 20 performs the suction operation in two stages. The first suction operation is used for adjusting the liquid cut-off position, whereas the second suction operation is used for adjusting the liquid level position of the treatment liquid in the nozzle 8.

SECOND EMBODIMENT

Figure 6:
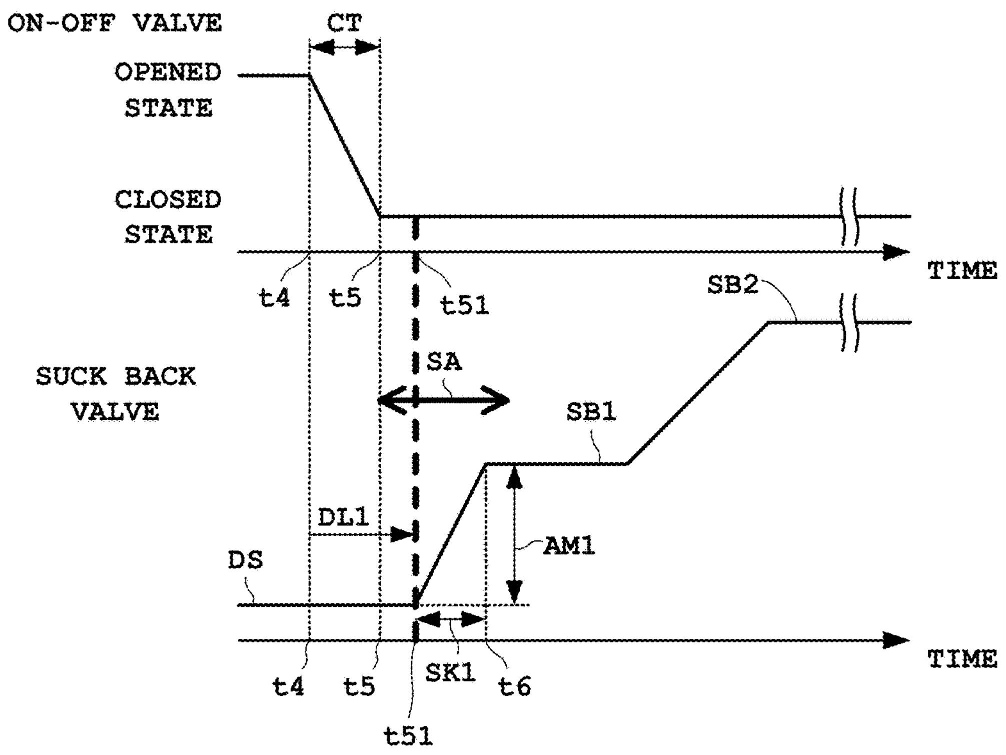
FIG. 6 is a timing chart illustrating operation of a substrate treating apparatus according to a second embodiment.

The following describes a second embodiment of the present invention with reference to the drawings. Here, the description common to that of the first embodiment is to be omitted. FIG. 6 is a timing chart illustrating operation of a substrate treating apparatus 1 according to the second embodiment.

In FIG. 3 of the first embodiment, when the liquid cut-off position is adjusted, the controller 20 causes the suck back valve 18 to start the first suction operation at the time point t5 when the on-off valve 17 finishes the closing operation. In this regard, when a liquid cut-off position is adjusted in the second embodiment, a controller 20 may cause a suck back valve 18 to start first suction operation in a pre-set period of time SA from a time point t5 when an on-off valve 17 finishes closing operation. This yields adjustment of the liquid cut-off position.

In FIG. 4, if the closing time CT of the on-off valve 17 is 0.2 seconds, for example, the suction delay time DL1 has a wide range of the determination A and the determination B (or of only the determination A). So, as shown in FIG. 6, the first suction operation is performed within the pre-set period of time SA from the time point t5 when the on-off valve 17 finishes the closing operation. Here in FIG. 6, the first suction operation starts at a time point t51 within the period of time SA. Moreover, the period of time SA is determined through examinations like the range of the determination A and the determination B (or of only the determination A) shown in FIG. 4.

According to this embodiment, the liquid cut-off position can be adjusted easily like the first embodiment. Moreover, the function of adjusting the liquid cut-off position can work even if the first suction operation does not start in accordance with the time point when the closing operation of the on-off valve 17 is finished. That is, a width of timing for starting the first suction operation can be obtained for working of the function of adjusting the liquid cut-off position.

THIRD EMBODIMENT

Figure 7:
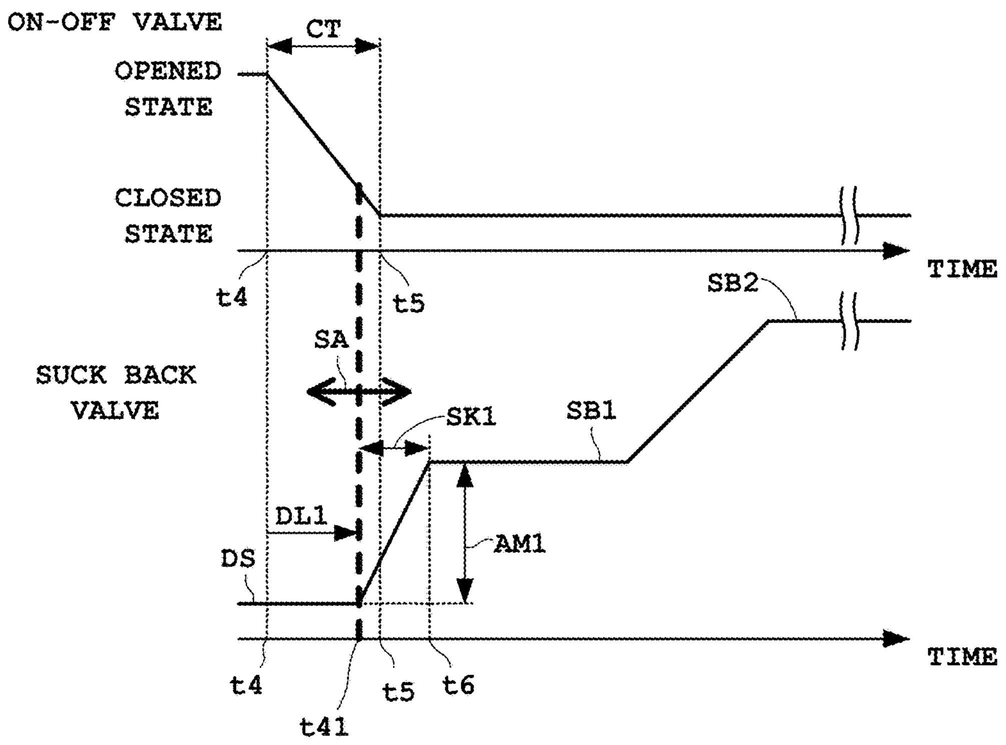
FIG. 7 is a timing chart illustrating operation of a substrate treating apparatus according to a third embodiment.

The following describes a third embodiment of the present invention with reference to the drawings. Here, the description common to that of the first and second embodiments is to be omitted. FIG. 7 is a timing chart illustrating operation of a substrate treating apparatus 1 according to the third embodiment.

In FIG. 3 of the first embodiment, when the liquid cut-off position is adjusted, the controller 20 causes the suck back valve 18 to start the first suction operation at the time point t5 when the on-off valve 17 finishes the closing operation. In this regard, as shown in FIG. 7 of the third embodiment, a controller 20 may cause a suck back valve 18 to start first suction operation while an on-off valve 17 performs closing operation and to finish the first suction operation after the closing operation is finished when a liquid cut-off position is adjusted. This yields adjustment of the liquid cut-off position.

Moreover, a treatment liquid of high viscosity is used in the first embodiment. In this embodiment, a treatment liquid of middle viscosity (e.g., 65 cP) is used. The treatment liquid of high viscosity moves due to its large inertia force even when the on-off valve 17 is completely closed. Accordingly, even if the first suction operation is performed after a short delay after the on-off valve 17 is completely closed, the function of adjusting the liquid cut-off position works satisfactorily (see the range width of the determination A in FIG. 4, the period of time SA in FIG. 6).

In contrast to this, with the treatment liquid of lower viscosity than the treatment liquid of high viscosity, the liquid is dry and responds quickly. So, when the on-off valve 17 is closed completely, the treatment liquid stops rapidly. Accordingly, a period of time where the liquid has flowability is short. As a result, the function of adjusting the liquid cut-off position works satisfactorily even when the suck back valve 18 starts the first suction operation while the on-off valve 17 performs the closing operation. Therefore, a width of timing for starting the first suction operation can be obtained for working of the function of adjusting the liquid cut-off position.

According to this embodiment, the liquid cut-off position can be adjusted easily like the first embodiment. A width of timing for starting the first suction operation can be obtained for working of the function of adjusting the liquid cut-off position.

The present invention is not limited to the foregoing examples, but may be modified as follows.

(1) The treatment liquid in the first embodiment described above is a treatment liquid of high viscosity (e.g., 325 cP), and the treatment liquid in the third embodiment described above is a treatment liquid of middle viscosity (65 cP). The treatment liquid may have middle viscosity or high viscosity of approximately 45 cP to 500 cP. Moreover, the treatment liquid may have viscosity other than a range of about 45 cP to 500 cP.

In a case where the treatment liquid of high viscosity is used, it is preferred that, when the liquid cut-off position is adjusted, the controller 20 causes the suck back valve 18 to start the first suction operation in a pre-set period of time SA from the time point t5 when the on-off valve 17 finishes the closing operation. The liquid cut-off position can be adjusted easily if the treatment liquid having high viscosity is used.

Moreover, when the treatment liquid of middle viscosity or low viscosity is used, it is preferred that the controller 20 causes the suck back valve 18 to start the first suction operation while the on-off valve 17 performs the closing operation and to finish the suction operation after the closing operation is finished when the liquid cut-off position is adjusted. The liquid cut-off position can be adjusted easily if the treatment liquid having medium viscosity or low viscosity is used.

Figure 8:
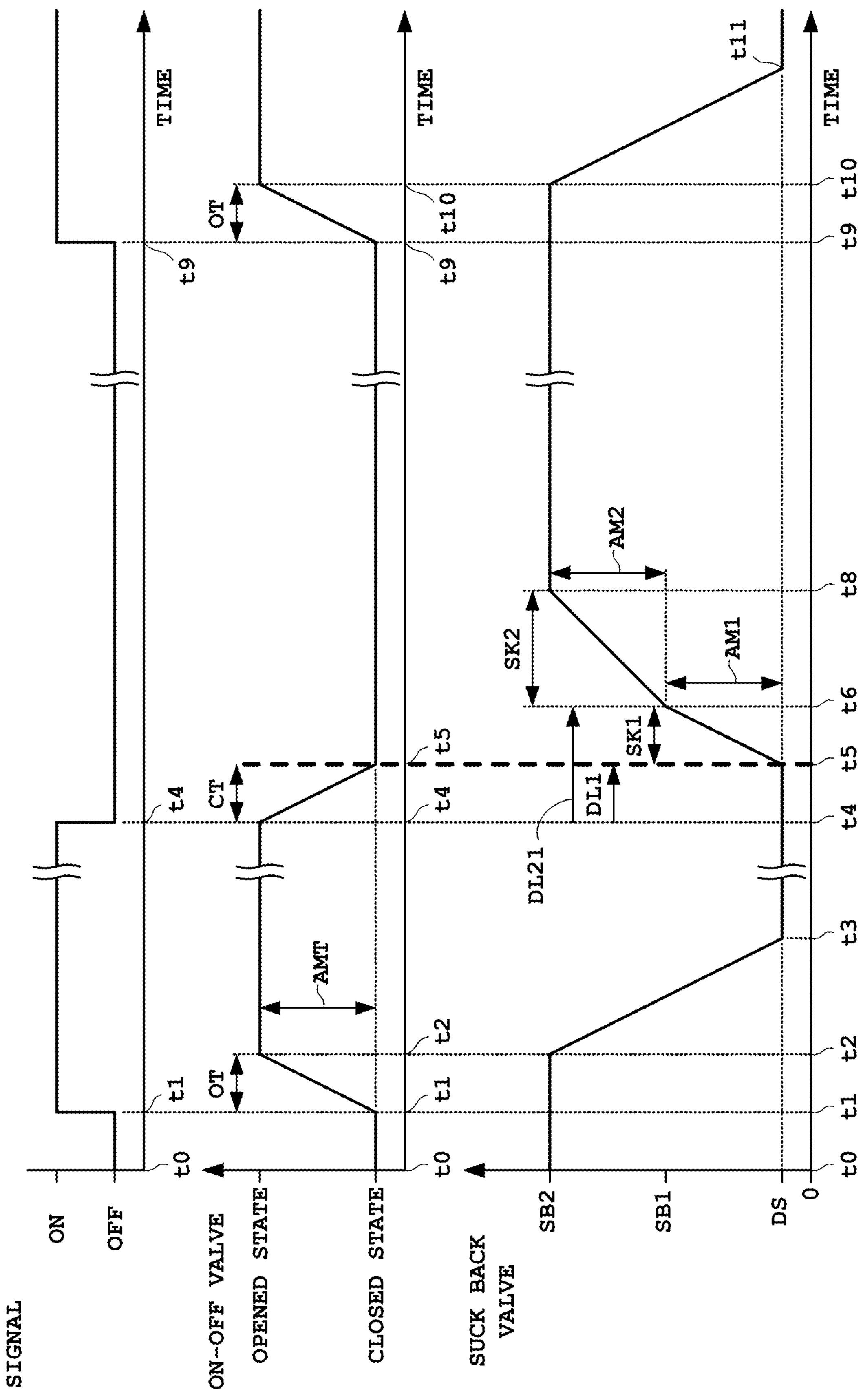
FIG. 8 is a timing chart illustrating operation of a substrate treating apparatus according to one modification.

(2) In the embodiments and the modification (1) described above, as shown in FIG. 3, the second suction operation starts after the suction delay time DL2 from the time point t6 when the first suction operation finishes to the pre-set time point t7 elapses. In this regard, as shown in FIG. 8, the second suction operation may start at the time point t6 when the first suction operation finishes. That is, in this case, the suction delay time DL2 is 0 (zero) second.

Note that the speed of the second suction operation is preferably made lower than the speed of the first suction operation. When the speed of the second suction operation is high like that of the first suction operation (e.g., the suction time SK1 of 0.1 seconds), a droplet is separated from the sucked treatment liquid and adheres to the inner wall of the inner passage 8A of the nozzle 8, which droplet may be the particle source.

Moreover, when the first suction operation and the second suction operation are made continuous, unstable liquid cut-off may occur. Accordingly, as shown in FIG. 3, it is preferred that the second suction operation starts after the suction delay time DL2 from the time point t6 when the first suction operation finishes to the pre-set time point t7 elapses.

Figure 9:
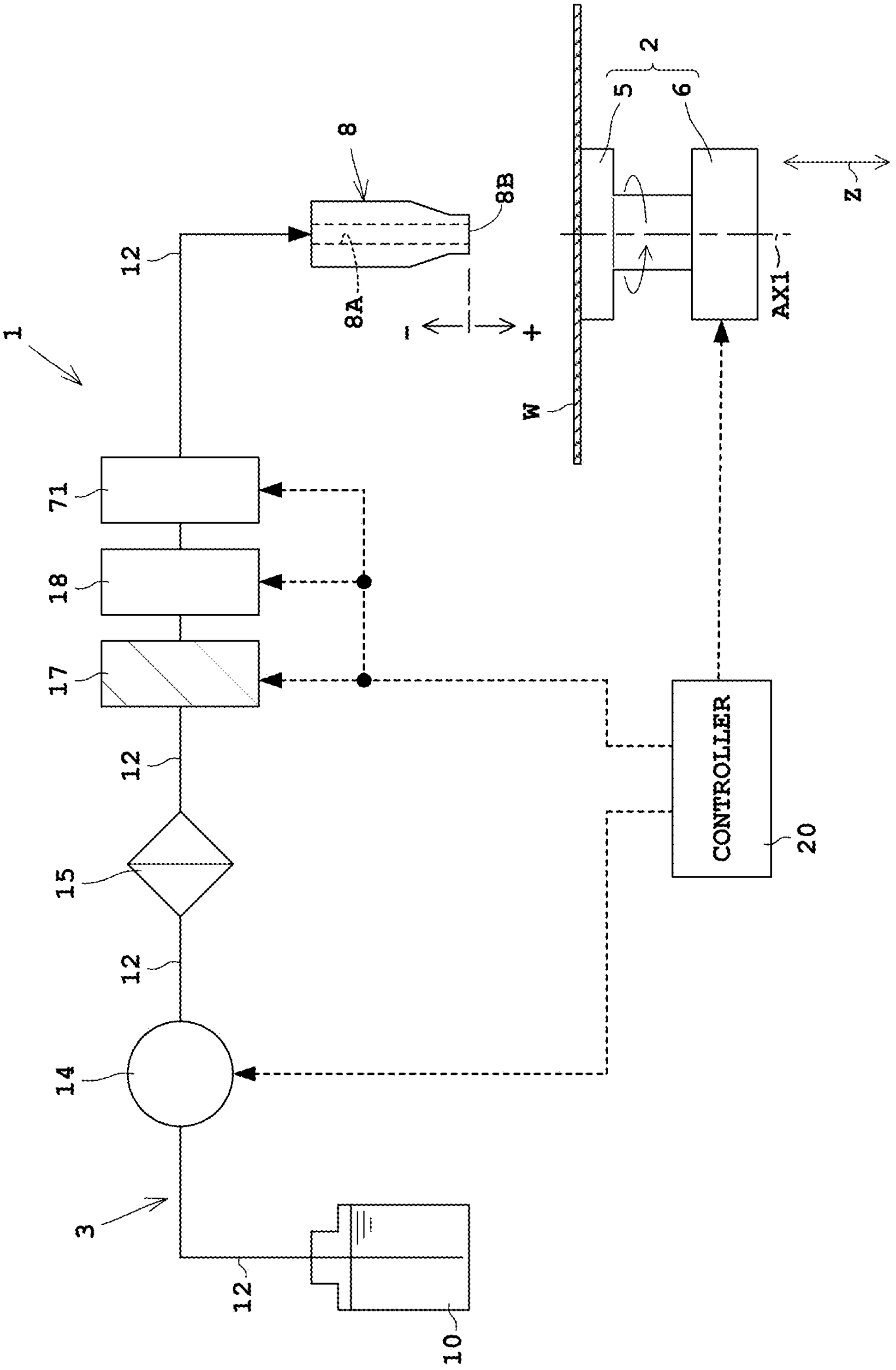
FIG. 9 schematically illustrates a substrate treating apparatus according to another modification.

(3) In the embodiments and the modifications described above, the substrate treating apparatus 1 includes the single suck back valve 18. In this regard, as shown in FIG. 9, the substrate treating apparatus 1 may include a suck back valve 71 in addition to the suck back valve 18. The suck back valve 71 is provided on the pipe 12 between the nozzle 8 and the suck back valve 18. Arrangement of the two suck back valves 18, 71 may be reversed.

The two suck back valves 18, 71 each may be driven by an electric motor of by gas. As for the suck back valves 18, 71 driven by gas, a speed controller or an electropneumatic regulator may be used.

In this modification, the controller 20 may cause the suck back valve 18 to perform the first suction operation and may cause the second suck back valve 71 to perform the second suction operation. Moreover, two tasks are replaceable with each other. That is, the controller 20 may cause the second suck back valve 71 to perform the first suction operation and may cause the suck back valve 18 to perform the second suction operation.

(4) In the embodiments and the modifications described above, the controller 20 adjusts the liquid cut-off position to the level of the tip end face of the nozzle 8. Such adjustment is performed using the liquid level position after the liquid cut-off that indirectly represents the liquid cut-off position. In this regard, the substrate treating apparatus 1 may be configured to include a high-speed camera capable of capturing an image in the vicinity of the tip end of the nozzle 8 and to cause the controller 20 to determine the liquid cut-off position from the image captured by the high-speed camera. Here, the high-speed camera has an imaging function of a frame rate (frame per second) that can determine the liquid cut-off position finely.

(5) In the embodiments and the modifications described above, the controller 20 causes the suck back valve 18 to perform the first suction operation and the second suction operation in association with the closing operation of the on-off valve 17 in FIG. 3, for example. In this regard, if the second suction operation for suck back is not necessary, the controller 20 may perform only the first suction operation without performing the second suction operation.

(6) In the embodiments and the modifications described above, the substrate treating apparatus 1 shown in FIG. 1 includes the pump 14. The substrate treating apparatus 1 may further include a pump or pumps, in addition to the pump 14, provided on the pipe 12 between the filter 15 and the on-off valve 17. That is, the substrate treating apparatus 1 may include two or more pumps.

(7) In the embodiments and the modifications described above, a photoresist solution or an SOG solution is used as the treatment liquid, for example. However, the treatment liquid is not limitative to these. As for the treatment liquid, a solvent, a developing solution, a rinse liquid, an etching solution, or a cleaning liquid may be used. As for the solvent, thinner may be used, for example. As for the rinse liquid, pure water like deionized water (DIW) or a surfactant rinse liquid may be used, for example.

As for the etching solution, hydrofluoric acid (HF), a mixed liquid of hydrofluoric acid (HF) and nitric acid ($HNO_3$), Tetramethylammonium hydroxide (TMAH) may be used, for example. As for the cleaning liquid, SC1, SC2, or SPM may be used, for example. SC1 is a mixed liquid of ammonia, hydrogen peroxide water ($H_2O_2$), and water. SC2 is a mixed liquid of hydrochloric acid (HCl), hydrogen peroxide ($H_2O_2$), and water. SPM is a mixed liquid of sulfuric acid ($H_2SO_4$) and hydrogen peroxide water ($H_2O_2$).

REFERENCE SIGNS LIST

1 . . . substrate treating apparatus
8 . . . nozzle
12 . . . pipe
17 . . . on-off valve
18, 71 . . . suck back valve
20 . . . controller
23, 43 . . . diaphragm
CT . . . closing time
DL1 . . . suction delay time
AM1 . . . operating amount
SK1 . . . suction time
SA . . . period of time

The invention claimed is:

1. A treatment liquid supplying method for a substrate treating apparatus provided with a nozzle configured to eject a treatment liquid, a pipe connected to the nozzle, an on-off valve provided on the pipe, and a suck back valve provided on the pipe between the nozzle and the on-off valve, the method comprising:

an ejection stopping step of stopping ejection of the treatment liquid from the nozzle by causing the on-off valve to perform a closing operation;

a liquid cut-off position adjusting step of adjusting a liquid cut-off position as a position where the treatment liquid in a column shape ejected from the nozzle is cut off by causing the suck back valve to perform a suction operation in association with the closing operation by the on-off valve; and a liquid level position adjusting step of adjusting a liquid level position of the treatment liquid as a downstream end position of the treatment liquid in a passage in the nozzle by causing the suck back valve to perform a second suction operation after the liquid cut-off position is adjusted by the liquid cut-off position adjusting step; wherein the second suction operation in the liquid level position adjusting step is started after a delay time that endures from a time point when the suction operation in the liquid cut-off position adjusting step is completed until a pre-set time elapses.

2. The treatment liquid supplying method according to claim 1, wherein, in the liquid cut-off position adjusting step, the liquid cut-off position is adjusted to a level of a tip end face of the nozzle.

3. The treatment liquid supplying method according to claim 1, wherein a speed of the suction operation in the liquid cut-off position adjusting step is higher than a speed of the second suction operation in the liquid level position adjusting step.

4. The treatment liquid supplying method according to claim 1, wherein, in the liquid cut-off position adjusting step, the liquid cut-off position is adjusted by starting the suction operation with the suck back valve in a pre-set period of time from a time point when the on-off valve finishes the closing operation.

5. The treatment liquid supplying method according to claim 1, wherein, in the liquid cut-off position adjusting step, the liquid cut-off position is adjusted by starting the suction operation with the suck back valve during the closing operation of the on-off valve and by finishing the suction operation after the closing operation.

6. A substrate treating apparatus, comprising:

a nozzle configured to eject a treatment liquid;

a pipe connected to the nozzle;

an on-off valve provided on the pipe;

a suck back valve provided on the pipe between the nozzle and the on-off valve; and a controller, wherein the controller is configured to:

stop ejection of the treatment liquid from the nozzle by causing the on-off valve to perform closing operation;

adjust a liquid cut-off position as a position where the treatment liquid in a column shape ejected from the nozzle is cut off by causing the suck back valve to perform suction operation in association with the closing operation by the on-off valve; and adjust a liquid level position of the treatment liquid as a downstream end position of the treatment liquid in a passage in the nozzle by causing the suck back valve to perform second suction operation after the liquid cut-off position is adjusted and after delay time from a time point when the suction operation is finished to a pre-set time point elapses.

7. The substrate treating apparatus according to claim 6, wherein the suck back valve is a single suck back valve, and the controller is configured to cause the single suck back valve to perform the suction operation and the second suction operation.

8. The substrate treating apparatus according to claim 6, further comprising:

a second suck back valve provided on the pipe between the nozzle and the on-off valve, wherein the controller is configured to cause the suck back valve to perform the suction operation and causes the second suck back valve to perform the second suction operation.

* * * * *